United States Patent [19]

Denman et al.

[11] Patent Number: 4,625,947
[45] Date of Patent: Dec. 2, 1986

[54] TIRE LIFT/CARRIER

[75] Inventors: Stephen A. Denman, Centerville; Garthwood R. Taylor, Dayton, both of Ohio

[73] Assignee: Deuer Manufacturing, Inc., Dayton, Ohio

[21] Appl. No.: 627,029

[22] Filed: Jul. 2, 1984

[51] Int. Cl.[4] .................... B66D 1/14; B66D 1/34; B66D 1/36; B66D 1/58
[52] U.S. Cl. .................... 254/323; 242/117; 242/125.1; 254/333; 254/342; 254/383; 414/463; 464/77; 464/84
[58] Field of Search .............. 254/323, 325, 327, 333, 254/342, 344, 370, 371, 383; 414/463, 466; 242/117, 125.1; 464/73, 77, 84, 37, 103, 34

[56] References Cited
U.S. PATENT DOCUMENTS

| | | | |
|---|---|---|---|
| 870,106 | 11/1907 | Jones | 464/77 |
| 939,734 | 11/1909 | Muller | 242/118.4 |
| 1,085,731 | 2/1914 | Hafner | 464/77 |
| 2,019,512 | 11/1935 | Stahl | 242/117 |
| 2,894,610 | 7/1959 | Harrington | 254/903 |
| 3,248,087 | 4/1966 | Hallen | 254/383 |
| 3,539,152 | 11/1970 | Paul | 254/323 |
| 3,690,529 | 9/1972 | Prest | 254/383 |
| 3,807,697 | 4/1974 | Cotreau et al. | 254/383 |
| 3,865,264 | 2/1975 | Kuhns | 414/463 |
| 3,874,536 | 4/1975 | Watanabe | 414/463 |
| 4,043,437 | 8/1977 | Taylor | 464/37 |
| 4,059,197 | 11/1977 | Iida | 414/463 |
| 4,174,797 | 11/1979 | Yasue et al. | 224/42.23 |
| 4,249,682 | 2/1981 | Yasue et al. | 224/42.23 |

*Primary Examiner*—Billy S. Taylor
*Attorney, Agent, or Firm*—Jacox & Meckstroth

[57] ABSTRACT

The illustrated embodiment which is in the form of a winch (or hoist) comprises a reel including a spool and embodying a portion thereof through which it may be driven for its raising and lowering functions. The reel mounts in bearing relation to a drive shaft between parallel relatively closely spaced side walls of its housing. This embodiment features an overload clutch including a drive plate mounted for rotation with said shaft within said housing. The drive plate nests within a shallow cup-shaped plate firmly and resiliently coupled by springs, parts of which have an interfit relation with portions of the bounding wall. Upon rotation of the shaft the nature and direction thereof is transmitted through the clutch and successive drive transmission elements to the portion of the reel provided for this purpose. The spool includes a narrow track the base of which is formed in a special arcuate pattern, an interior pocket which is formed to anchor one end of a cable and a restricted passage leading from the pocket, to open from said base, the line of which is lateral to a line radial to the spool. The form of the base and the track dictates a natural stress free coil of the cable on the base and smooth extension of the cable from the winch housing. Additional features include a guide system for the cable providing not only a minimalizing of the wear, tear, and stress normally incident to the use of such apparatus but facilitating a most efficient use thereof where the winch is offset from the applied load. Controls are incorporated through the medium of which the rotation of the reel may be interrupted before the cable is completely unwrapped from the base of the spool.

21 Claims, 13 Drawing Figures

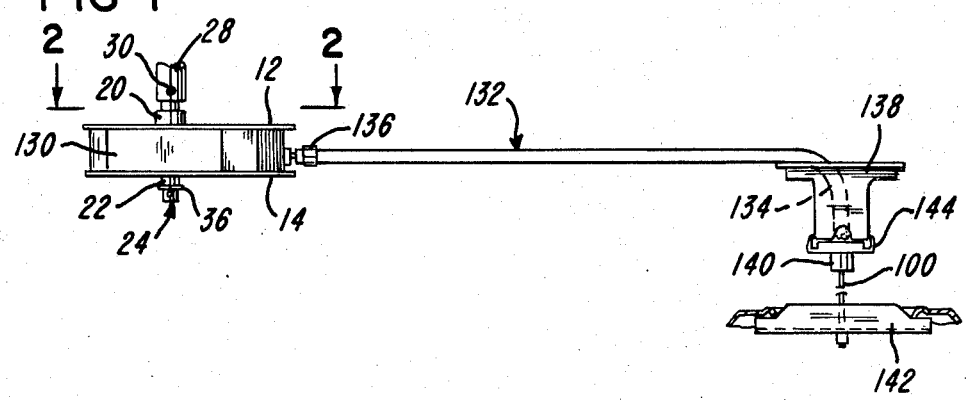
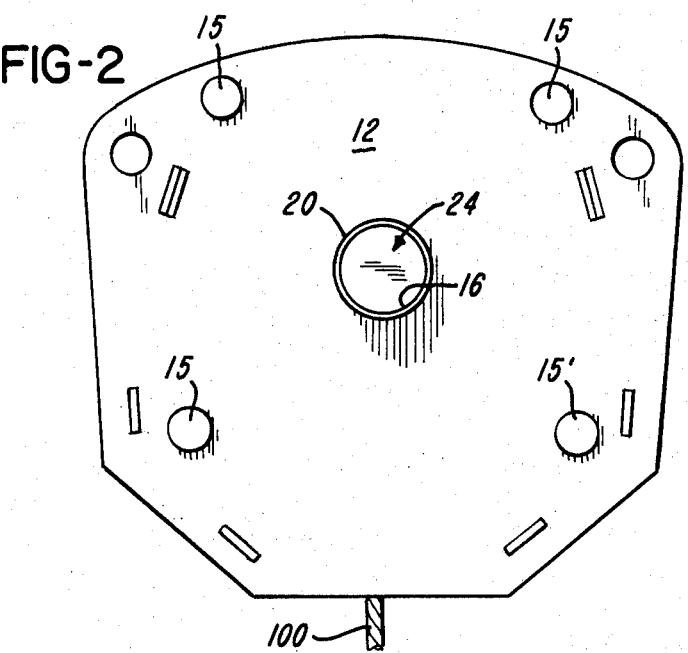
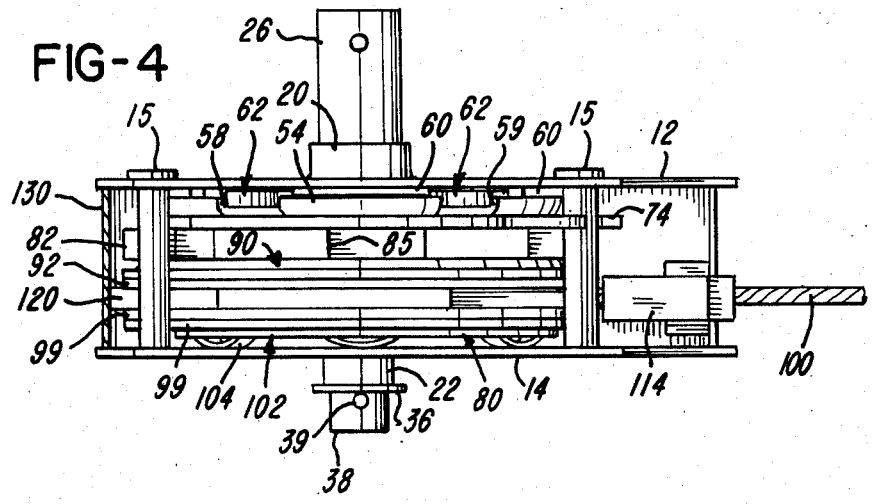

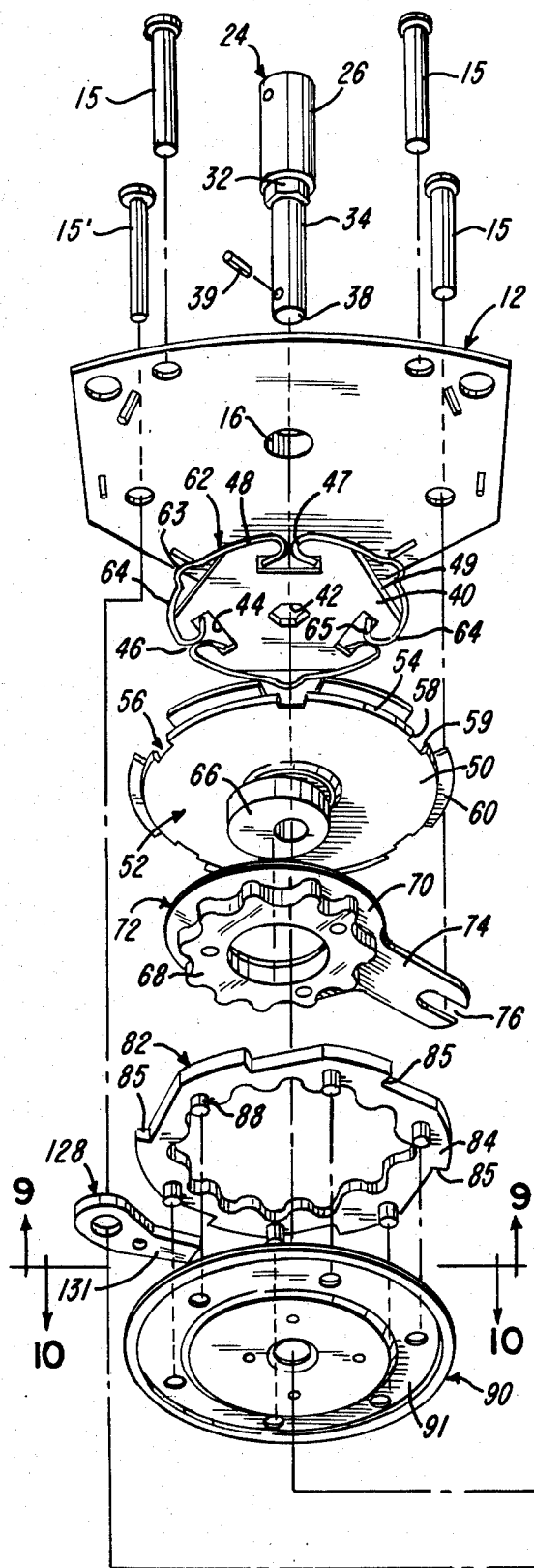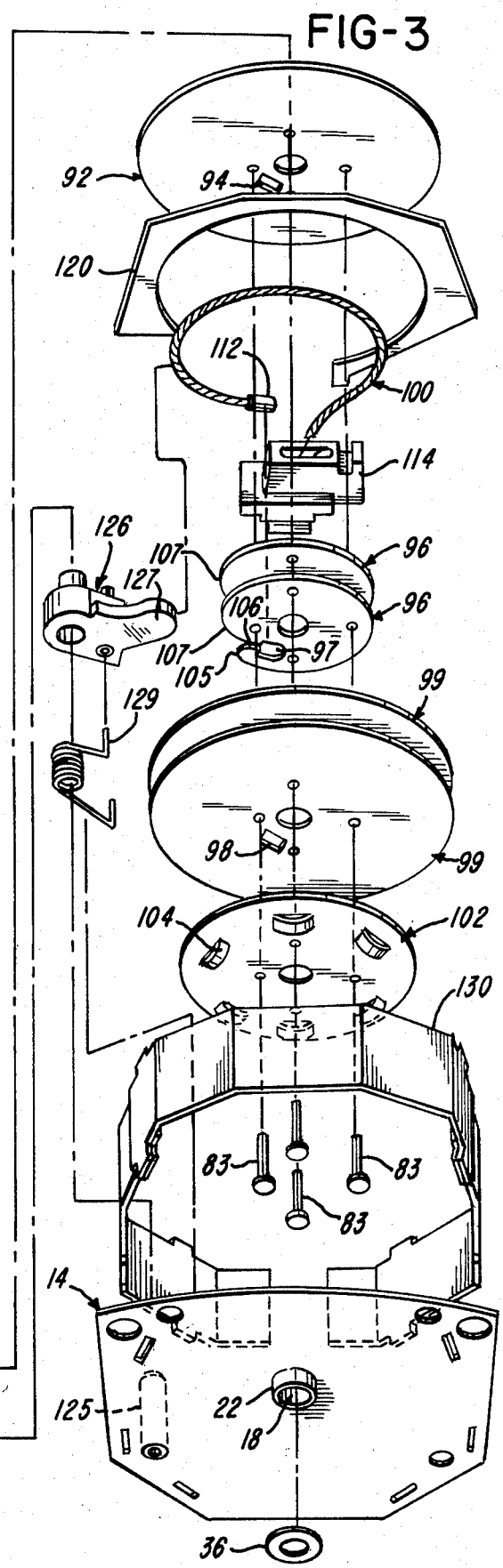

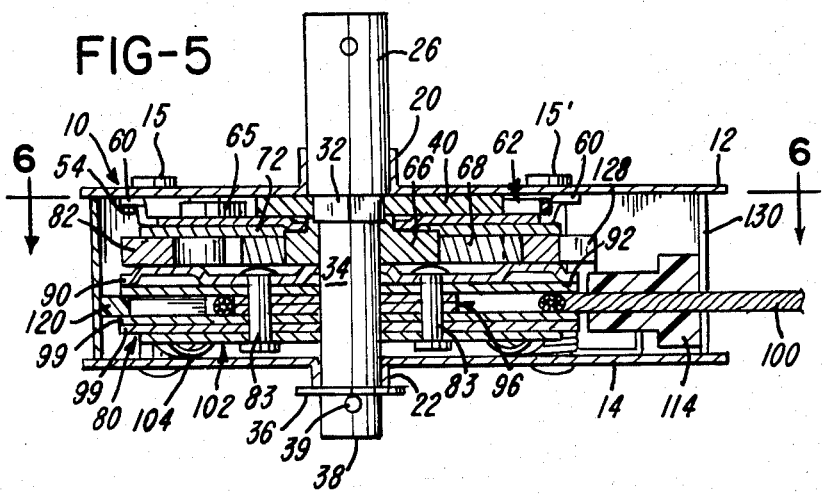
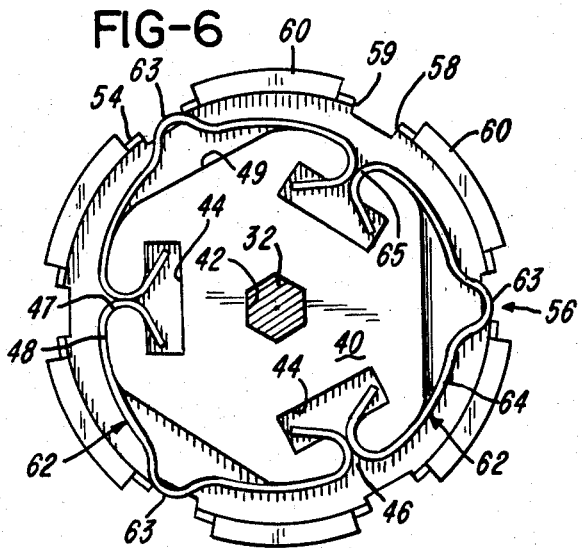
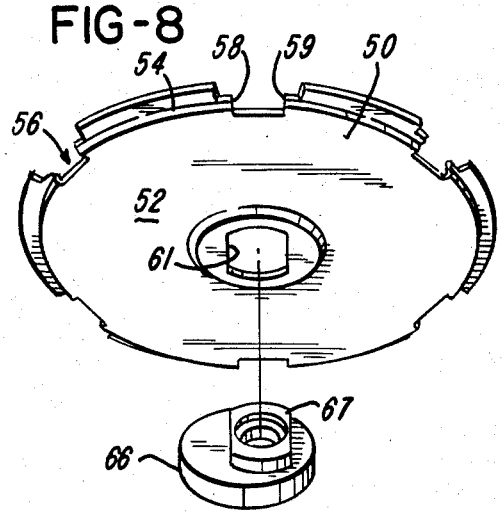
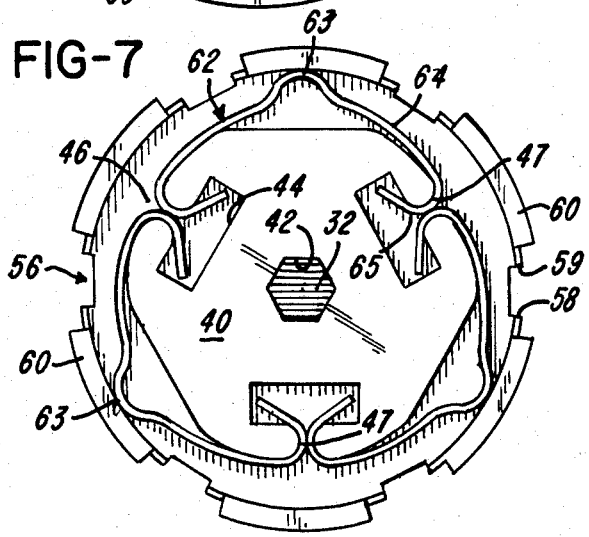
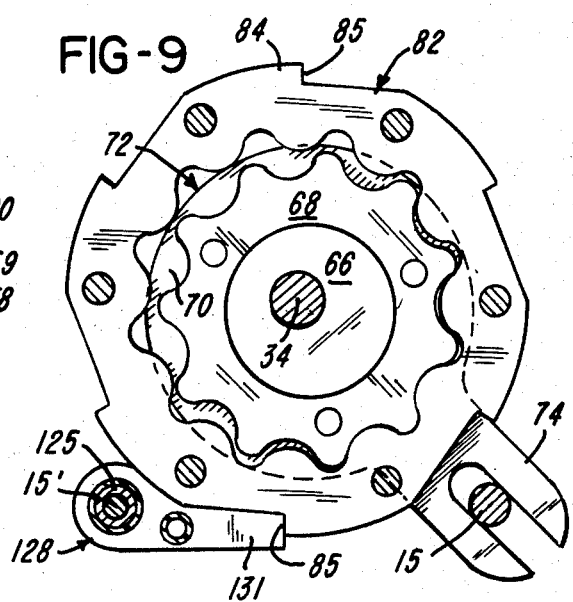

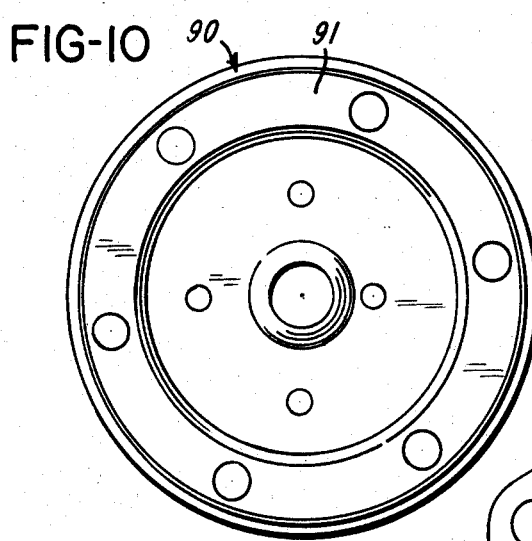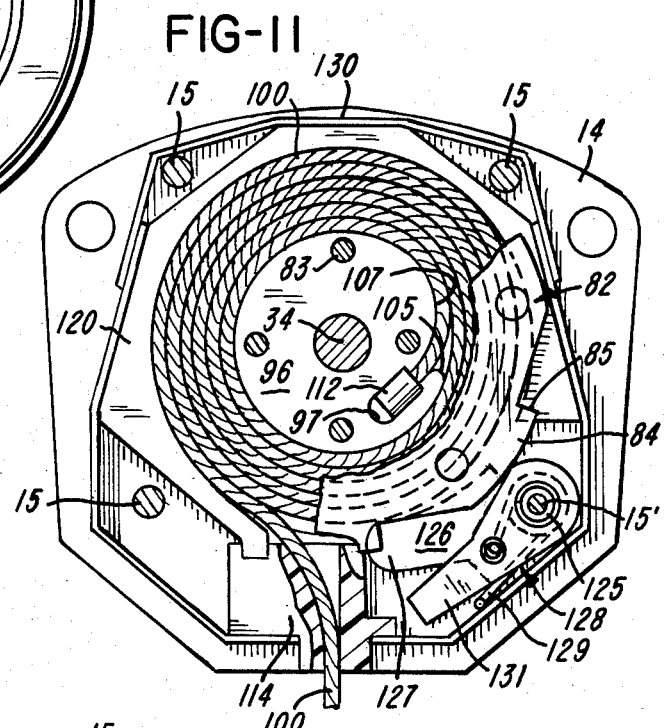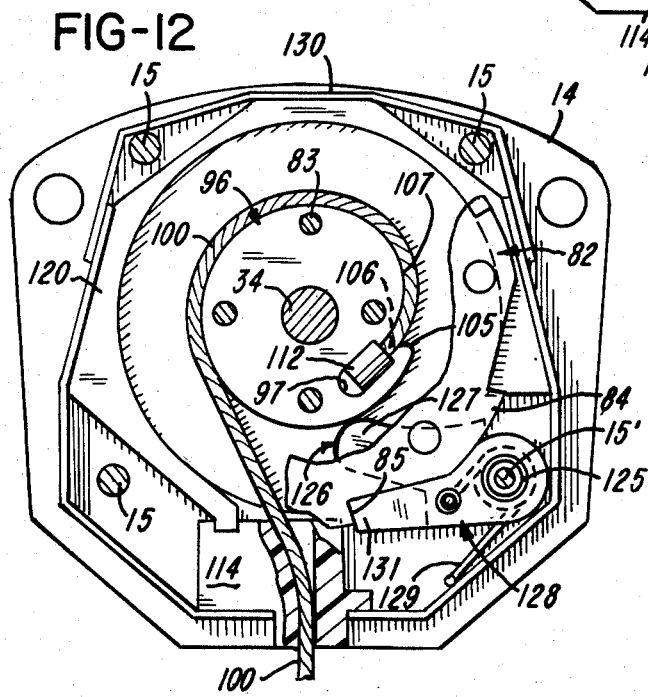

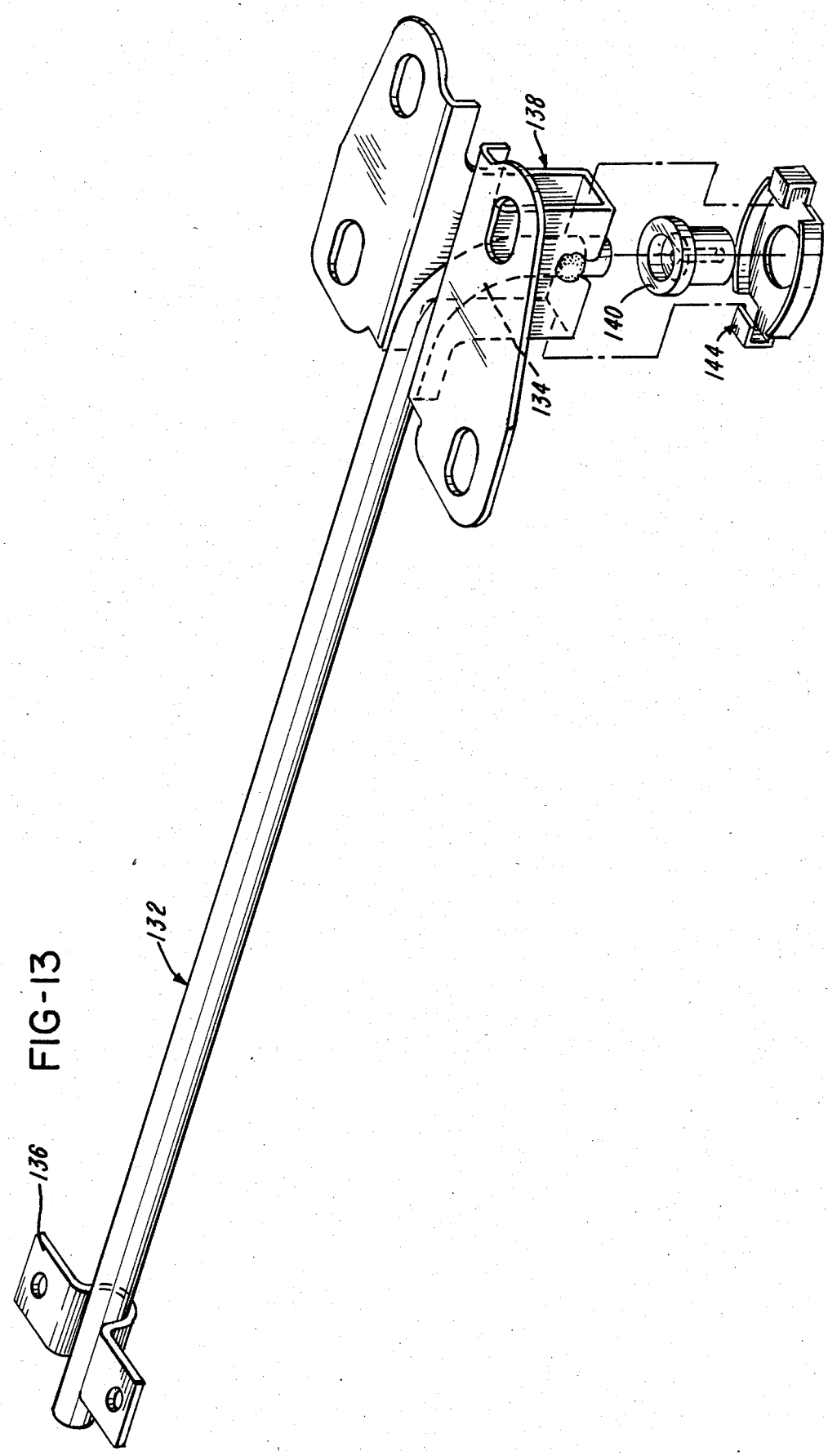

TIRE LIFT/CARRIER

BACKGROUND OF THE INVENTION

This invention relates to tire/lift carriers, like apparatus and installations thereof, featuring a cable type winch, embodying improvements providing significant advantage in the structure and function of its parts and rendering such devices more efficient and satisfactory in their use, economical to fabricate, more versatile as to their application. It also provides such apparatus with a longer life and a reduction in the amount of maintenance and replacement required for their operative parts.

A primary achievement of the invention is to solve problems heretofore existing in the art in respect to the application of such devices where the load to be lifted, lowered and/or carried thereby is other than essentially directly below and in line with the drum of the winch thereof. At the same time the invention provides elements for the improved guidance and control of the configuration of the lift cable of its embodiments which smooths the operation thereof as well as avoids what has heretofore been a source of its early fatigue in the practice of the prior art. Another important advance is evidenced by the provision of a new and improved overload clutch in the drive system or preferred embodiments of the invention, the release of which is more controlled and less abrupt than has heretofore been the case in the use of the prior art devices of this nature.

For purpose of illustration, but not by way of limitation as to the form of its embodiment or its application, the invention is here described with reference to a particular embodiment and installation thereof comprising a winch (or hoist) wherein the winch in use thereof is mounted to be essentially horizontal rather than vertical and the direction of its lift and carrier cable is other than simply vertical or in a straight line as it extends outwardly of its housing.

As far as those substantively involved in the presentation of this disclosure are aware, the only prior art truly pertinent to this invention is subject of Application for U.S. Pat. No. 554,278 filed Nov. 22, 1983, and now U.S. Pat. No. 4,544,136, which is a continuation of a prior filed, heretofore copending, Application Ser. No. 277,088 the filing date of which was June 25, 1981, and now abandoned. While not truly pertinent to the points of novelty of the present invention it is nevertheless noted for the record that the art cited in the prosecution of the aforesaid Application Ser. No. 277,088, now abandoned, consists of the following U.S. patents:

| Name | U.S. Pat. No. | Date |
| --- | --- | --- |
| Setsuo Yasue et al | 4,249,682 | Feb. 10, 1981 |
| R. Rongley | 4,222,246 | Sep. 16, 1980 |
| S. Yasue et al | 4,174,797 | Nov. 20, 1979 |
| H. Iida | 4,059,197 | Nov. 22, 1977 |
| Y. Watanabe | 3,874,536 | Apr. 1, 1975 |
| S. Yasue et al | 3,856,167 | Dec. 24, 1974 |
| H. Paul | 3,539,152 | Nov. 10, 1970 |
| B. G. Hadley | 3,352,508 | Nov. 14, 1967 |
| R. S. Perlini | 3,088,689 | May 7, 1963 |
| J. A. Harrington | 2,894,610 | July 14, 1959 |
| O. J. Muller | 939,734 | Nov. 9, 1909 |

SUMMARY OF THE INVENTION

Embodiments of the present invention comprise a cable type winch or hoist including a reel the drum or spool of which is comprised of a series of centrally apertured thin plates sandwiched in a side by side coaxial relation. The intermediate of these plates are smaller than the outer side plates which together therewith define a narrow track the base of which is formed by the outer peripheral edges of the smaller plates. The smaller plates are identical and each has therein an elongated aperture the elongation of which extends transversely of and at a right angle to a line radial to its central aperture. The plates which immediately bound the smaller plates and provide the side walls of the track each have a similarly elongated aperture which aligns coaxially with those in the smaller plates to define therewith a pocket receiving and anchoring one end of a lift cable in connection with the spool. The lift cable is threaded from this pocket by way of a narrow passage, commonly defined by slots in the smaller plates, to exit from the narrow cable track, on the base of which it is wrapped on itself prior to its exit from the winch housing by way of a plastic guide. The form of the smaller plates immediately of the exit end of the narrow passage dictates a one way wrap of the cable on and about their outer periphery, the configuration of which minimizes the chance of cable hang up, kinking or fatigue in use thereof.

In preferred embodiments of the invention that portion of the lift cable which is on the spool at any given time is circumscribed by a generally horseshoe shaped bearing element which together with a cable follower and the plastic guide for exit of the cable from the winch housing extends essentially 360°. This provides an optimal control and bearing surface for the cable, within the winch housing, which contributes to an overall inhibition of cable fatigue and wear and insures its smooth and malfunction free operation.

The cable follower has an interconnected stop pawl which moves therewith as it bears against that portion of the cable outermost on its track at any given time. The stop pawl is related to ratchet teeth on the outer periphery of a ring shaped internal gear connected to and in coaxial relation with one of the end plates of the reel. The construction and arrangement of the stop pawl is such that it engages with and prevents further rotation of the internal gear and correspondingly the interconnected reel at such time that the cable follower senses that essentially only a single winding of the cable remains on the reel. The result of this structure is to preclude a total unwrapping of the cable from its drum. The consequence of this is to preserve the integrity of the cable as well as its interconnection with the spool at all times.

The sandwiched elements of the reel all have central apertures which are coaxially aligned and accommodate the projection therethrough and provide for their free bearing mount on a drive shaft keyed to which is an improved clutch assembly through which the reel and an interposed eccentrically driven external gear in mesh with its interconnected internal gear may be driven. The clutch assembly comprises a relatively thin plate the outer periphery of which is circumscribed by a series of outwardly projected co-planar bowed springs. The ends of these springs are anchored and positioned with reference to the keyed plate so they virtually encompass essentially 360° of its outer peripheral extent.

The plate and its co-planar springs are nested within a centrally apertured shallow cup-shaped plate, which is the driven element of the clutch assembly, to have shaped intermediate, relatively projected, portions of the springs resiliently lodge in circumferentially spaced notches or slots in the bounding wall structure of the cup-shaped plate.

Fixed to and projected from the outer face of the base of the cup-shaped plate is a cam through the body of which the central aperture of the cup-shaped plate is extended at a location eccentric to the circular cross section of its outer peripheral surface. The drive shaft extends through the central aperture in the cup shaped plate and the cam and through the central aperture of a small external gear the diameter of which is large enough and so shaped as to provide for its mount about and in bearing relation to the outer peripheral surface of the cam. At the same time the external gear nests within, co-planar with and eccentrically of the internal gear in mesh, in part, with a portion of its teeth. A radially directed arm in connection with one face of the external gear has its projected extremity bifurcated to define a slot so that it may receive therein and mount in bearing relation to one of a series of rivets which interconnects the relatively parallel side plates of the winch housing. The housing side plates have aligned apertures rimmed by bearings accommodating the projection therethrough and the bearing relation thereto of the respective end portions of the reel drive shaft which mounts, intermediate the side plates, the clutch and the aforementioned gear mechanism through which the reel is driven on rotation of the shaft. A compressible spacer plate is interposed between the reel and the housing side plate remote from the clutch. The peripheral wall of the winch housing which bridges the side plates and establishes the position of the cable guide structure within the housing is comprised of shaped wall segments, edge portions of which interfit in slots in the housing side plates.

The winch can function most admirably in most any orientation with reference to a ground surface. A horizontal orientation thereof such as will be particularly described is most advantageous where the load to be carried by its lift cable is, of necessity, offset from the location of the winch per se.

The invention provides for a simple but most efficient extension of the cable guide within its housing which can be easily installed to insure a trouble free path through which the lift cable can easily and freely move and smoothly function, under load or otherwise.

The overload clutch and its function is particularly unique in that it will consistently release at the same level of applied torque, a level which is below that critical limit beyond which damage to the winch apparatus can occur. Moreover, its design is such that no jarring of the winch mechanism occurs as the clutch disengages and reengages. As a matter of fact, the operator immediately senses the smooth and shock free disengagment of the clutch in response to an overload. There is no free wheeling of the driver elements of the clutch and subsequent to its disengagement they reflect, in the continuing rotation thereof, a continuing high though somewhat lower torque, as the springs thereof bear on their bounding wall surface. As will be obvious, the improved overload clutch herein described will function equally as well in each of the opposite directions of its rotation. In its embodiment in a tire lift/carrier it serves also as an indicator and correspondingly a control assuring a required set position of the tire to insure against its displacement on the occasion of vibration and shock effects during and as a consequence of operation of the vehicle on which it is carried. This together with the construction of the reel and the guide system of the present invention embodiments provide for an unusually high degree of control and protection of the lift cable and associated equipment.

The foregoing summarizes the essence of a preferred embodiment of the invention the broader aspects of which will become readily apparent from the following more detailed description thereof.

A primary object of the invention is to provide improvements in tire lift/carriers and like apparatus which are economical to fabricate, render them more efficient and satisfactory in use and adaptable to a wide variety of applications, minimize their maintenance requirements and extend their operation life.

Another object is to provide improvements in the controls embodied in tire lift/carriers and like apparatus which render them safer and easier to use.

A further object is to provide improvements in cable type winches, hoists and carriers which facilitate the wrapping and unwrapping of their cables, smooth their operation and minimize their fatigue factor.

An additional object is to provide an improved overload clutch having a particularly advantageous application to tire lift/carriers and the like.

Another object is to provide improvements in apparatus for and installations of cable type tire lift/carriers and the like which facilitate their application to environments wherein the winch or hoist thereof must be remote from and other than essentially vertically aligned with reference to its load.

A further object is to provide a cable type winch or hoist with improvements as to cable guidance and control.

Another object is to provide improvements in cable type reels, winches and drums which improve their operation in respect to the wrapping and unwrapping of their cable.

An additional object is to provide a tire lift/carrier and parts thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein is shown one but not necessarily the only form of embodiment of a tire lift/carrier and parts thereof comprising the present invention, FIG. 1 illustrates a side elevation of an installation of a tire lift/carrier of the present invention;

FIG. 2 is a view of the housing of the tire lift/carrier taken on line 2—2 of FIG. 1, the view being rotated to illustrate a vertical rather than the horizontal orientation thereof dictated by the installation of FIG. 1, which indicates the versatility of its application;

FIG. 3 is an exploded view of the operative structure of the tire lift/carrier of FIGS. 1 and 2;

FIG. 4 is an enlarged elevation view of the winch as observed in FIG. 1;

FIG. 5 is a cross-sectional view of the apparatus of FIG. 4;

FIG. 6 is a view of the clutch embodied in the apparatus of FIG. 5, taken on line 6—6 thereof, shown in an engaged condition;

FIG. 7 is a view similar to FIG. 6 except that the clutch is shown in a disengaged condition;

FIG. 8 is an exploded view of the driven disc of the clutch and an interconnected cam;

FIG. 9 is an elevational view taken on line 9—9 of FIG. 3 with parts removed for clarity of disclosure;

FIG. 10 is an elevational view taken on line 10—10 of FIG. 3;

FIG. 11 is a view taken in the same frame of reference as the structure shown in FIG. 2 with parts removed and broken in part to illustrate details of improvements of the invention with reference to cable guide, control and housing features and illustrating the lift cable wrapped on its spool;

FIG. 12 is a view such as that of FIG. 11 differing only by reason of the lift cable being shown in an unwrapped, extended condition; and FIG. 13 is a perspective view of the external cable guide extending from the winch housing.

Like parts are indicated by similar character of reference throughout the several views.

The winch assembly herein illustrated comprises a housing 10 including a pair of identically shaped side plates 12 and 14 which in the assembly thereof are disposed in a directly aligned, parallel, relatively closely spaced relation.

Viewing these plates in the orientation thereof in FIG. 2 of the drawings, each has a laterally centered aperture, respectively 16, 18, which is more closely adjacent its upper edge than its lower edge and peripherally rimmed by a short sleeve, respectively 20, 22, integral with, projected from and perpendicular to its outermost face. The aperture 16 and sleeve 20 in connection with plate 12 define a passage and bearing surface the diameter of which is uniform the length thereof and larger than that likewise defined by the aperture 18 and sleeve 22 in connection with the plate 14. These bearing sufaces are coaxially aligned, bridged by and support for rotation thereon and relative thereto a winch drive shaft 24.

The shaft 24 is stepped as to its diameter and has one end portion 26 thereof which exhibits its largest diameter projected through and in bearing relation to the sleeve 20. The innermost end of the shaft portion 26 is located essentially in the plane of the inner surface of the plate 12 while its outer end portion is connected to a telescopically applied end of a crankshaft 28 coupled thereto by a diametrically applied pin 30 through the medium of which it may be driven in an obvious manner and for purposes to be further described. The end of the shaft portion 26 within the housing 10 is immediately followed by a very short portion 32 of the length of the shaft which is reduced by peripherally applied flats, causing it to be hex-shaped in cross section. The remainder 34 of the shaft 24 extends beyond the portion 32 to project through, in bearing relation to and slightly beyond the sleeve 22. The shaft portion 34 has a uniform diameter which is complementary in dimension to that of the inner diameter of the sleeve 22. Immediately of the outer end of the sleeve 22 the shaft portion 34 projects through a washer 36 immediately beyond which the brief remaining portion 38 of its length has an aperture, diametrically thereof, accommodating a pin 39 the projected ends of which serve to hold the washer in bearing relation to the outer end of sleeve 22 which it abuts.

Within the housing 10 and between the plates 12 and 14, the shaft 24 mounts a reel assembly together with interrelated apparatus through which it is driven in accordance with the present invention. This shaft mounted structure is held between the radial, circularly spaced, co-planar shoulders defined at the inner end of the shaft portion 26 in creating the hex-shaped cross section of the following shaft portion 32 and the shoulder defined by the subsequent reduction of the shaft diameter and the plate 14 which is backed by the washer 36 and the pin 37. Further containment of the housed structure is achieved by tying together the plates 12 and 14, by four rivets 15 arranged in a rectangular pattern to bridge these plates immediately outward of the radial limits of the shaft mounted apparatus which is, in fact sandwiched therebetween.

Considering the aforementioned shaft mounted apparatus, in the order of its application, the first element thereof is a clutch plate 40 having a central aperture 42 the hex-shape and dimension which is complementary to that of the shaft portion 32 by means of which it is snugly fit thereon, thereabout and keyed thereto.

Three rectangular apertures 44 formed in the body of the clutch plate 40 at locations spaced radially and equidistantly from the center of its aperture 42 have their own centers circularly and equidistantly spaced, 120° apart, and their radially innermost and radially outermost edges respectively parallel to one of the flats of the hex-shaped edge of the aperture 42. The arrangement of each aperture 44 is such that a line extending through its center and the center of the aperture 42 bisects its inner and outer edges. The radially outermost edge of each aperture 44 is interrupted at its center by a radial passage 46 the outermost limit of which opens from a radially outermost portion of the outer periphery of the plate 40. Each passage 46 is bounded at its sides by edge portions 47 of the plate 40 which are convexly arcuate, the arc in each case being formed on the same radius. The outermost end of each arcuate edge portion 47 blends into and is smoothly continued by an arcuate segment 48 of the outer peripheral edge of the plate 40. As here provided there are six segments 48 each of which is relatively short in length. As will be seen from the drawings, the segments 48 are clearly paired with respect to each passage 46 and one of each such pair is further paired with the next adjacent segment 48 bounding a side of a next adjacent passage 46. In the case of each of the latter pairs, the adjacent ends of their arcuate configurations are bridged by a straight flat edge portion 49 of the outer peripheral edge of the clutch plate 40 with which their arcuate configurations smoothly merge. Thus, the configuration of the outer peripheral edge of the plate 40 is defined by the segments 48 and flats 49.

The plate 40 is followed by and seats within and in centered relation to the base 50 of a very shallow cup-shaped plate 52 the bounding wall 54 of which is formed integral with and projects outwardly from and perpendicular to the outer peripheral edge of its base. The wall 54 and the outer peripheral edge portion of the base 50 with which it joins are formed to have six rectangular cutouts 56 arranged in a circumferentially and equidistantly spaced relation. The bounding edge portions 58, 59 of each cutout 56 are in a parallel spaced relation and, within the limits of the wall 54, perpendicular to the base 50. Centered between each pair of successively adjacent of these cutouts 56 and projected radially and outwardly of the projected edge of the wall 54 is a flange 60. The six flanges 60 so provided are circularly and equidistantly spaced and positioned in a common plane which is parallel to and spaced from the plane of the base 50. Note should be taken of the fact that the thickness of the plate 40 has a dimension which is only slightly less than that of the depth of the wall 54.

The base 50 of the shallow cup-like plate 52 has a central aperture 61 with which the central aperture 42 of the plate 40 is coaxially aligned as it abuts thereto. The clutch plate 40 in held in a centered spaced relation to the wall 54 by means of three arcuately formed identically configured springs 62. Each of the springs 62 has the major portion 64 of its longitudinal extent, which is centered between relatively short end portions 65 thereof, formed on a uniform, relatively large radius except for a very short central portion thereof which is offset outwardly to define thereon a tit-shaped detent 63 the outermost apex portion of which is formed on a very small radius and the inwardly directed sides of which are slightly but smoothly divergent. The end portions 65 of each spring 62 are respectively bent to reversely curve upwardly and inwardly of the respective ends of the bow shaped portion 64 to provide it with opposite hook shaped extremities on the inner sides thereof.

Each spring 62 is disposed outwardly of essentially 120° of the circumferential extent of the outer edge of the clutch plate 40 including an area thereof spanning successively adjacent passages 46 comprised of a flat 49 bounded and extended at each of its ends by a segment 48, each of the latter of which is extended in turn by an arcuate side edge portion 47 of one of the passages 46. As each spring 62 is symmetrically applied to and coplanar with the plate 40, as required, the central section of the length of its bowed portion 64 is subtended by the line of the flat 49 and beyond the respective ends of this flat the remainders of the bowed portion 64 and the hook-shaped extremities thereof extend over and in bearing relation to the segments 48 to either end of the flat and inwardly and about and in bearing relation the side surfaces 47 of the adjacent passages 46 and into each of the respective apertures 44 to which the passages 46 open to angle symmetrically and commonly in the direction of the most adjacent side portions of these apertures. The net effect is that each spring 62 is resiliently clipped about and contains the described section of the plate 40 to which it is applied.

As so mounted the springs 62, in their composite, not only encompass substantially 360° of the circumferential extent of the plate 40 but serve as resiliently anchored spacers between the latter and the wall 54 of the cup-shaped plate 52. More particularly, as will be noted from the drawings, the positioning of the springs 62 and the plate 40 is such that the tit-shaped detent portions 63 lodge in three of the cutouts 56 in the wall 54 which are positioned 120° apart, in the process of which to resiliently wedge between and in bearing relation to their bounding edges 58, 59 in each case. Note that since plate 40 will in the assembly of the structure be mounted to and about the shaft portion 32, in the drive of the shaft the plate 40 will be driven thereby and in turn drivingly related to the plate 52 by means of the springs 62, in particular their tits 63.

The aperture 61 of the plate 52, which is larger than the aperture 42, has the bounding edge thereof shaped to consist of a pair of opposite segments thereof formed as straight lines which have a parallel spaced relation and each of their opposite paired ends joined by a further segment of such bounding edge which is formed as a convex arc.

Integrally connected with and axially projected from one face of a disc shaped cam 66 is an adapter 67 which is complementary in cross section to and formed to press fit in the aperture 61 of the base 50 of the plate 52. The cam 66, the outer periphery of which is formed on a uniform radius, has an eccentrically positioned aperture, extended through the adapter 67, the diameter of which is of a size enabling it to be slip fit to the shaft portion 34 to position in following abutted relation to the plate 52. In actual practice the cam 66 will be assembled to the plate 52, in obvious manner, prior to their assembly to the shaft 24. In any case, in the assembly of the plate 52 and the cam 66 to the shaft, one face of the cam 66 will abut the outer surface of the base 50 of the plate 52 and its opposite face will position radial to the shaft.

It should of course be obvious that the apparatus to mount to the shaft 24 beyond the inner end of the portion 26 thereof will be applied thereto prior to the application of the housing side plate 14, the washer 36 and the pin 39.

The apparatus next following the plate 52 and cam 66 is composed of an annular external gear 68 one face of which is fixed to one face of an annular portion 70 of a control plate 72, in bounding spaced relation to a central aperture therein. The control plate 72 is completed by an arm portion 74 which projects radially of its annular portion 70 and has its outermost extremity bifurcated to define therein an inwardly directed longitudinally extended notch 76. The application of the control plate 72 and the gear 68 to the shaft 24 is accommodated by the coaxially aligned apertures defined therein. The arrangement of the parts in such application provides that the plate 72, that is the annular portion thereof, abuts the outermost surface of the base 50 of the plate 52 as the gear 68 is positioned about and in bearing relation to the outer peripheral bearing surface of the cam 66, in a generally co-planar relation thereto. Note is made of the fact that in the application of the rivets 15 to bridge the plates 12 and 14 one of the rivets will project at right angles to the control arm 74 of the plate 70 and to and through the notch 76 at its radially outermost extremity. As will be seen, this enables a bearing movement of the bifurcated end portion of the arm 74 on such rivet in a manner and for purposes to be further described.

The plate 74 and the gear 68 are followed on the shaft 24 by a reel assembly 80. The reel assembly 80 is composed of a series of following elements which are sandwiched and riveted into a sub-assembly which may be described as follows.

As shown, the reel assembly 80 includes annular internal gear 82 and six following plates successively disposed beyond the control plate 72, secured in face abutting side by side relation, for conjoint rotation on the shaft portion 34, by four rivets 83.

The internal gear 82 is ring shaped, has a plate form providing it with parallel faces. Its inner peripheral edge is formed to include a set of gear teeth complementary to and adapted to mesh with those of the much smaller diameter external gear 68. The outer peripheral edge of the internal gear is cut to embody teeth 84 having the general shape of such as those found on the outer edge of a ratchet wheel, the trailing edge 85 of each of the six teeth 84 so provided being radial, and flat and short in its radial extent.

In its assembly about the shaft portion 34, one face 86 of the gear 82 is placed immediately of the outer peripheral edge portion of the one face of the annular portion 70 of the control plate 72 through which projects the cam 66. As thus applied, the gear 82 is positioned co-planar with cam 66 and about and co-planar with the gear 68 which is disposed within and eccentric thereto. As will be seen, this arrangement is such that only a portion of the teeth of the relatively small external gear 68 will at any one instant during the drive thereof be in mesh with and in driving relation to the teeth of the internal gear 82.

The body of the ring shaped gear 82 is punched at each of a series of equidistant circularly spaced locations therein to produce in the one face therein adjacent the control plate 72 a series of circularly spaced sockets and at the opposite face thereof a similar series of short stud-like projections 88 the axial length of which corresponds to the depth of the sockets. The stud-like projections 88 so provided are integral with the gear 82 and each disposed radially inward of and centered between a pair of successively adjacent radially oriented trailing edge portions 85 of the teeth 84.

The projections 88 are press fit in a corresponding series of circularly spaced apertures in an annular plate 90 the dimension of the outer diameter of which corresponds to that of the outer diameter of the gear 82. The dimension of the diameter of inner peripheral edge of the plate 90 is complementary to that of the shaft portion 34 so that it bears thereon as it mounts thereabout with and in following relation to the interconnected gear 82. An annular portion 91 of the plate 90 immediately inward of its outermost edge is offset and dished outward from the remainder thereof to provide that surface portion of this plate to which the gear 82 seats as it is fixedly coupled thereto. The apertures in which the projections 88 are press fit fall within the limits of the annular portion 91. By virtue of the above described offset of the portion 91, the surface of the plate 90 which faces away from the internal gear 82 is provided with a corresponding annular recess which spaces a very narrow outer edge portion from its more substantial co-planar portion which is radially inward thereof.

The plate 90 is followed on the shaft portion 34 by a relatively thin annular plate 92 the ouer and inner diameters of which respectively correspond in dimension to those of the plate 90. The plate 92 includes a small generally rectangular aperture 94 positioned in a relatively adjacent radially spaced relation to and radially of its central aperture, defined by its radially innermost edge. The orientation of the aperture 94 is such to provide that a line radial to the central aperture of the plate 92 which bisects its longitudinally extending, radially spaced, sides is perpendicular thereto.

Each of the next two following plates 96 are thin, identical in shape and considerably smaller in size by comparison with their bounding plates. Each plate 96 has a central aperture like the plate 92 by means of which it likewise mounts about and in bearing relation to the shaft portion 34. It also includes an opening forming in the body thereof a generally rectangular cutout 97 radially spaced from its central aperture having parallel radially spaced longitudinally extending side edge potions perpendicular to which is a line radial to its central aperture, by which line such side edge portions are substantially bisected.

In the assembly and connection of the plates of the reel, by four rivets 83, the cutouts 97 of the plates 96 align not only with each other but with the aperture 94 of the plate 92 and a similar rectangular aperture 98 provided in each of a pair of following identical thin plates 99 which are identical with the plate 92. The plates 92 and 99 which bound the plates 96 form therewith a spool on which a cable 100 wraps on itself, about the base of the track defined thereby which is provided by the outer peripheral edges of the plates 96.

The plates 99 are immediately followed and abutted, on the shaft portion 34, by a centrally apertured plate 102 forming an end plate of the reel the opposite end plate of which is the plate 90 which mounts the internal gear. The plate 102 is lanced and formed to produce therein six circularly and equidistantly spaced bow shaped projections 104 offset outwardly and equally from that face of the plate which is remote from the plates 99. By virtue of its projections 104, the plate 102 is compressible. It is therefore simply and easily adjusted as to the degree of projection of its portions 104 as the housing plate 14 is applied over the shaft portion 34 in following relation thereto and interconnected and drawn to the plate 12 by four rivets 15, as previously described, to fix the reel and those other elements mounted on the shaft 24 between the plates 12 and 14 in a precise side by side following relation to enable their effective interfunction. The plate 14 is established immediately within the aperture in the end portion 38 of the shaft 24 and its position is fixed on application of the retention pin 39. The components of the winch which mount about the shaft are thereby fixedly contained at one end by the plate 14 and at their other end by the shoulders formed on the drive shaft by the reduction of its cross section in forming the portion 32 thereof and the further such reduction immediately following the portion 32. The sandwiched containment of the shaft mounted parts is increased not only by the rectangular pattern of the rivets 15 which tie the plates 12 and 14 together but also by reason of their placement immediately outward of the peripheral extent of the interposed shaft mounted elements.

Benefits of the plates 96 as constructed in the embodiment herein disclosed are found in the configuration of their outer peripheral edges and in the manner in which this is correlated with the communication thereof with the interior of their cutouts 97.

A major section of the outer peripheral edge of each plate 96, to the extent of approximately 270° thereof, is formed on a substantially uniform radius. One end portion of the 270° arc so provided is located immediately outward of and projects slightly beyond the longitudinal extent of the cutout 97, which is in a direction transverse to the aforementioned radial line by which it is bisected, and is terminated by an extension provided by a reversely directed curve 105. The curve 105 is formed on a very small radius and extended by a relatively short straight line which defines one side of a passage 106 in the body of the plate 96. The passage 106 opens at one end which constitutes its inner end to and from the cutout 96, at a location intermediately the limits of the outermost of the shorter sides of the cutout which bridge the aforementioned longitudinally extending radially spaced side edges thereof. The other end of the aforesaid approximately 270° arcuate extent of the outer peripheral edge of each plate 96 is itself extended in a smooth arc 107 which has a sprial configuration. This spiral is formed to gradually approach more closely the central aperture of the plate 96 and extends to a point short of, opposite and spaced inwardly of that point at which the reverse curve 105 terminates at the outer end of the one side of the passage 106 which defines its extension. From this point the spiral arc 107 is extended by a short, straight line edge portion of the plate 96 which is in a parallel closely spaced relation to the straight line extension of the curve 105 and forms the opposite side of the passage 106.

As will be seen, the spacing between the sides of the passage 106 is less than the length of the side of the cutout through which the inner end of the passage 106 opens. Accordingly there are portions of this side of the cutout to either side of the inner end of the passage which are perpendicular thereto.

The effect of the shaping of the outer peripheral edges of the plates 96, their cutouts and their common passages 106 which open to and from one end of the cutout 97 in each case causes the plates 96, when oriented in a vertical elevation such as shown in FIG. 2 to resemble in profile a head having a mouth and lips which are defined by the cutouts 97 and the sides of the passage 106. As will be seen from FIGS. 11 and 12 of the drawings, the upper lip is extended by a portion of the spiral curve 107 and the lower appears as part of a jaw when viewed with the reverse curve 105 and the underlying end portion of the approximately 270° arc which this curve extends.

By virtue of the alignment of plates 90, 92, and 96 in successive face abutting relation in the assembly of the reel and its spool, the cutouts 97 together with the generally rectangular aperture 94 provide a socket or pocket within the interior of the spool in which one end portion of the lift cable 100, about which a metal sleeve 112 is in this case fixed, is nested and retained by the application of the plates 99 and 102 as the plates of the reel are assembled and sandwiched together by the application of the rivets 83. As the sleeve 112 and the end of the cable to which it is fixed is dropped into the pocket defined in the plates 96 by their cutouts 97 and the extension thereof provided by the aperture 94, prior to the application of the plates 99, the portion of the cable immediately following the end mounting the sleeve 112 is laid in the groove defined by the common passages 106. From this point the remaining portion of the cable is projected outwardly of the plates 96 so that on application the plates 99 and 102 to complete the reel, and the interconnection of its plates by rivets 83, the outer portion of the cable can be smoothly wrapped on itself in a natural configuration to first follow the pattern of the outer surface of the plates 96 defined initially by the spiral curve 107 and then extend from the winch housing by way of its exit passage in the cable guide 114, which is preferably of plastic material. It should be noted that in the application and containment of the one end of the cable 100 including the sleeve 112 in the pocket formed within the spool, it is inherently restrained from dislodgement because of the limiting abutment surfaces to either end thereof. However, it is enabled to have a small amount of endwise movement though very restricted in this respect also.

It is further noted that in the provision of holes for the rivets applied, they are so arranged in the plates which comprise the sub-assemblies of the invention structure that such plates can be asembled only in one way. This enables a simple and economical fabrication of embodiments of the present invention.

Also, clamped between the facing plates 92 and 99 which immediately bound the plates 96 is a horseshoe shaped cable guide 120, preferably of plastic, the inner surface of which positions in outwardly displaced bounding relation to about 270° of the outer peripheral edges of the plates 96. The side plates 12 and 14 of the housing 10 are each provided with an identical series of slots, the respective slots therein being opposed and paired to receive rectangular tab-like extensions from opposite edge portions of plates 130 which together form an encompassing peripheral wall for the winch assembly mounted to the portions 32 and 34 of the shaft 24. One end of the horseshoe shaped guide 120 has a rectangular projection on the outer peripheral surface portion thereof which hooks into a recess provided in an inner portion of the plastic guide 114. The space between the opposite end of the guide 120 and the guide 114 is bridged by the finger 127 of a cable follower 126 which is also preferably of plastic. The group of elements 120, 114 and 126 produces a bearing surface of essentially 360° which encompasses the portion of the cable 100 on the spool (92, 96, 99) and lends a most protective and efficient means which particularly together with the shape of the plates 96 insure a trouble free movement of the cable to and from the spool which is protective thereof as well as rendering the winch more efficient in use.

As seen FIGS. 11 and 12 of the drawings, which illustrate a clockwise drive of the shaft 24, the rivet 15' bridging and interconnecting the plates 12 and 14 at approximately a 4 o'clock position with reference to the clockwise movement of the spool, defined by the plates 96 and the bounding plates 92 and 99, is in this instance provided with a sleeve 125. Mounting about the sleeve 125 is a coil spring 129 one end of which seats in abutment to the inner surface of the housing side plate 14. By virtue of a plastic lined aperture the follower 126 mounts about the sleeve 125 to seat to the other end of the spring 129, in the process of which a tangentially directed right-angled extremity of the spring hooks into a recess in the body thereof in a position radially displaced from the sleeve 125. The opposite end portion of the spring 129 which seats to the plate 14 includes a portion thereof extending tangentially to and outwardly from its coil the projected extremity of which is bent at right angles to the preceding portion and projects from and perpendicular the plate 14. This part of the spring which bears against the plate 14 and its right angled projected extremity is biased to bear against the peripheral wall of the winch housing in a manner not only to be contained thereby but to cause a bias of the follower 126 to which it is hooked inwardly of the spool of the reel, between the facing plates 92 and 99 thereof, in the direction of the base of the track of the spool, defined by the plates 96, on which base the lift cable 100 is limited to be wrapping on itself. The construction and arrangement is such to produce a constant bias of the projected extremity of the finger portion 127 of the follower 126 against the outer coil of the cable wrapped on the base of the track of the spool at any given time.

Coupled to and coaxially with the follower 126, by mating, press fit male-female parts thereof is the body of a stop pawl 128 which has an aperture aligned with that of the follower 126 providing for its common mount and rotation with the follower, in abutment with a portion of the face thereof and remote from the spring 129. The stop pawl 128 the body of which has a plate form includes a finger-like portion 131 co-planar with the internal gear 82, the projected extremity of which finger is normally positioned immediately outward of the ratchet teeth 84 on its peripherally outermost surface. As will be further seen, the bias of the spring 129 is to induce a conjoint rotation of the follower 126 and the stop pawl 128 to provide that the stop pawl is caused to so position as to lodge behind the back edge 85 of a ratchet tooth 84 on the outer periphery of the internal gear 82 precisely at such time as the lift cable 100 has been unwrapped from the spool to the point (in the particular preferred embodiment illustrated) that approximately 180° to 270° of a single wrap of the cable is left on the spool.

As seen in FIGS. 11 and 12 the stop pawl 128 and follower 126 are so interconnected that in the clockwise drive of the spool the finger 131 of the stop pawl is fixed counterclockwise of the finger 127 to trail this finger by an angle which may vary but in this instance is shown to approach 30°. As will be obvious, a stop of the rotation of the gear 82 will occur at a time prior to the complete discharge of the cable. The provision of this control is to insure that in no instance will the cable totally unwrap from the spool and produce unnecessary stress or strain. Beyond the spool the cable portion within the housing being encompassed by its essentially 360° bearing structure will optimally configure as it is passed from the winch housing through the cable guide 114. The benefits of this should be readily apparent, since it affords insurance as to preservation of the integrity of the cable per se.

The foregoing structure is that provided in a preferred embodiment of the invention, in the present instance providing for its most advantageous application as a tire lift/carrier. FIG. 2 illustrates this embodiment to provide apparatus which can readily be used in a conventional application, i.e. where the load is in a direct vertical alignment with the winch and in particular the spool thereof. In such attitude of use the benefits of the improvements of the invention will be readily apparent. However, the unit apparatus of the invention, by reason of the presently embodied improvements, are most advantageous in difficult applications where the load of necessity is offset from the line of the track of the spool of the winch. Such an application is graphically illustrated in FIG. 1 of the drawings to which all the other Figures thereof can be referenced.

FIG. 11 of the drawings is a view of the elements of the reel which exhibit the wrapping of the cable 100 about the outer periphery of the plates 96. As there seen the outer limit of the wrap and a limited portion of the cable extending counterclockwise therefrom is peripherally bounded by the immediate surface of the cable guide 120, the finger 127 of the follower 126 and the cable guide 114 on which the cable is adapted to bear as it is paid out. The cable issues from the winch housing by way of a passage defined in the body of the cable guide 114. Note that only a single track, defined within the spool of the reel, dictates that the cable is maintained in a single plane within the limits of the housing 10. In the example illustrated in FIG. 1, the cable remains in the same plane as it is extends in a straight line through the major extent of a length of tubing 132 the entrance end of which is aligned with and immediately of the exit opening of the cable passage in the guide 114. Thus, as seen in FIG. 1, by virtue of the horizontal attitude of the winch 10 and the same horizontal attitude of the major extent of the length of tubing 132, which forms an immediate extension of the passage in the cable guide 114, one can place the winch in one location and lead the cable therefrom laterally and horizontally in whatever direction required to the point of a 90° curve provided in the end portion of the tube 132 remote from the housing 10. A short vertical extension of the 90° curve is directly over the center of the load to be carried, lifted and/or lowered as it is controlled by an operation of the winch.

FIGS. 1 and 11 show the tire lift/carrier of the embodiment and installation of the invention just described in the attitude in which it is connected to the frame of a truck and a fragment of the spare wheel, the outer periphery of which mounts a tire, called by and supported from the cable 100 in their normally stored position with reference to the truck to which the lift/carrier is applied.

As shown in FIG. 1, for the purpose of mounting the wheel, and tire applied thereto, so that the structure may be stably supported in connection with the lift cable, in this instance, as schematically illustrated, the lower or dependent extremity of the cable mounts, by suitable means, and in known manner, a narrow rectangular plate 142. This plate applied lengthwise through the center of the aperture in the wheel mounting the tire is positioned in an attitude perpendicular to the cable after it is passed through the wheel to diametrically bridge the opening in the wheel and have its respective end portions positioned under and in supporting relation to the wheel and the interconnected tire.

When it is desired to lower the wheel and included tire from their stored position, in which they are illustrated in FIG. 1, through the medium of an interconnected handle (not shown), the crankshaft 28 will be manually cranked counterclockwise to extend the cable 100 and lower the supported wheel and tire. The drive of the reel, and accordingly the spool, which will be directed through the drive shaft 24, in particular the portion 32 thereof, will induce a rotation of the plate 40 and the assembled co-planar springs 62, thereby to resultingly drive the plate 52 very firmly, positively and uniformly by the engagement therein of the tits 63. This produces an oscillation of the external gear 68, a corresponding drive of the internal gear 82 and through it a counterclockwise rotation of the spool on which the cable 100 is wrapped on itself. As will be obvious, the result is that the cable will, by virtue of the present construction and configuration of the plates 96 and the cable guides 120, 126 and 114 smoothly and uniformly move from the winch housing. The spiral contour of the arc 107 forming the extension of the passage 46 in the plates 96 provides assurance that as the cable unwinds from the spool it will smoothly bear against the inner surface of the horseshoe shaped guide 120 as its contact is induced therewith. The cable will at this point be caused to assume a configuration which eliminates kinking, adverse bends and friction of the type that would produce objectionable wear and tear of the components of the winch. More than this, the construction and arrangement of the guide structure exterior to the winch in the installation shown in FIG. 1, details of which are illustrated in FIG. 13, eliminates serious problems heretofore found to exist in use of prior art devices applied to similar purposes where the load to be lifted and carried is out of direct line with the apparatus by which it is to be lifted, loaded and carried. The efficiency found in use of the noted improvements of the invention are particularly evidenced in such instances where the cable is lowered in absence of an applied load.

Attention is directed to the fact that as the cable 100 is paid out, the finger portion 127 of the cable follower 126, under the influence of the bias of the spring 129, moves inwardly between the plates 92 and 99 of the spool to constantly bear on the outer layer of the wrapped cable. At that point that only a single partial winding of the cable remains on the outer periphery of the plates 96, encompassing approximately 180° to 270° thereof, (when this point is reached, and not before) the projected extremity of the finger 131 of the stop pawl 128 is rotated sufficiently with the follower 126 under the influence of the spring 129 to move inwardly of the outer peripheral surface of the internal gear 82 and lodge behind the radially projected rear edge 85 of one of its ratchet teeth 84. This precludes a total unwrapping of the cable during the lowering thereof under load and provides a predetermined level of the load in its lowermost portion in connection with the cable 100. Additional benefits derive from such arrangement in that it precludes undue stress and strain at the point at which the cable is anchored to the plates 96 which might inadvertently cause damage to or dislodgement of the cable from its spool.

As will be obvious, noting FIG. 12, for lifting the drive shaft 24 is cranked clockwise. If for any reason a load is applied to the lower end of the cable for lifting thereof and its weight is more than the maximum limit prescribed, when the plate 40 and the interconnected springs 62 are driven clockwise, the tits 63 of the springs 62 will be felt to smoothly displace from and out of the notches 56 in the bounding wall 54 of the plate 52 and move onto the inner surface of the wall 54 from notch to notch without any perceptible strain of the cable resulting.

When the load is within prescribed limits, and the shaft 24 is driven clockwise, the tits 63 of the springs 62 will transmit the drive produced on rotation of the crankshaft and cause the spool to turn and the cable to smoothly wrap on the base of the track defined therein by the outer periphery of the plates 96, even with remoteness of the load as in the example illustrated in FIG. 1. The construction and arrangement is such that when by virtue of the degree of torque applied in drive of the spool it should by reason of carelessness or negligence exceed a predetermined, preset maximum limit, this will be reflected by the springs dislodging their tits 63 from the notches 56 in the driven plate at that point corresponding to the limit of the upward movement prescribed for the load. In other words, the load will have been lifted to that position in which it is prescribed that the load be carried. At such time, where there is a manual cranking as described, the operator of the winch will be able to feel that a smooth but pressured displacement of the tits from the notches in the wall 54, as would be the case where there is an overload. Note that the torque applied to the springs 62 will not in such cases drop to zero, under which conditions there could be danger to the operator. The torque will in such instance merely reduce a limited degree, sufficient only to distinguish from a condition such as exists when there is a driving of the plate 52. As indicated previously, in the event of an overload, such as would occur in the manner described, the tits 63 bear between the notches 56 against the inner wall surface of the plate 52. This safety feature positively precludes inadvertent damage to the winch or its parts where the operator applies himself or herself violently to the drive of the crankshaft. Thus the overload clutch structure of the invention serves admirably and most effectively in a dual capacity.

Referring to FIG. 13, the length of tubing 132 is fastened to the underside of the frame of the truck to which the lift/carrier apparatus is applied, by means of two longitudinally spaced brackets 136 and 138, each of which is generally U-shaped in transverse section and has co-planar wing-like flanges extending outwardly from, laterally of and perpendicular to the projected ends of the parallel arms of its cross sectional configuration.

As seen in FIG. 13, the bracket 136, the vertical extent of which is shorter than that of the bracket 138, has the U-shaped portion thereof in underlying and cupped relation to the tubing 132 adjacent its entrance end. As will be obvious, the flanges thereof are uppermost and suitably apertured for application therethrough of bolts or the like to fix it to the immediately overlying truck frame to which it is fastened.

The bracket 138 is applied to the end of the tubing 132 including the portion 134 thereof. The vertical extent of the U-shape of the bracket 138 is suitable to this end. In the case of this bracket the base of its U-shape is at right angles to its upwardly projected, closely spaced parallel arms and has a central aperture. In the application of the bracket 138, its parallel arms immediately bound opposite sides of the curved portion of the tubing 132 and its vertically dependent portion 134. The projected extremity of the portion 134 projects through and into the upper end of a coaxially aligned bushing the flange of which is abutted to the undersurface of the bracket base in rimming relation to its central aperture. The bushing 140 projects, in turn, through the central opening of a retention plate 144 which abuts the underside of its flange and holds it in a clamped relation to the underside of the bracket base as oppositely projected tabs thereof are bent upwardly and over the upper surface of the ends of the base of bracket 138 between the upstanding sides of its U shape. The bushing 140 is thereby clamped in connection with the base of the bracket to form a coaxial extension of the tubing portion 134. To either side of the plate 144, at a position spaced 90° from its tabs, are upstanding flanges enabling it to cup about opposite surfaces of the lower ends of the upstanding arms of the bracket. Attention is directed to the fact that the bushing 140 has a counterbore in the end thereof which disposes uppermost forming therein an annular shoulder to which the dependent extremity of the tubing portion 134 is seated. The bore of the bushing 140 in this instance is reduced in diameter with respect to that of the tubing 132 to accommodate the cable 100 being threaded therethrough in substantially bearing relation to the bounding portion of the inner wall surface thereof. As may be seen, this provides stability to the cable 100 as it extends downwardly from the tubing 132 to connect therebelow to the applied load. The benefits of this are seen both in respect to the lifting and lowering of the cable in use thereof for its intended purpose.

Note also should be taken of the fact that the very nature of the shaping and interrelation of the parts of the winch enables that it may be assembled with the drive shaft reversed end to end, as may be desired in a particular application. This contributes to the economy and efficiency of the construction provided in the embodiment of the invention here illustrated.

One further note should be made with reference to the fact that the flanges 60 provided on the driven plate 52 distinguish this structure from prior art driven elements applied heretofore for same purposes in that the flanges 60 provide increased thrust bearing surface in respect to the plate 12. This together with the whole arrangement of the improvements and construction of the winch provides that the parts thereof, including the cable 100, will have a most balanced operation throughout the various aspects of their functions. The winch unit, therefore, provides an extremely durable construction which is most effective for use in difficult applications, particularly with reference to the provision of a tire lift/carrier such as herein described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A tire lift/carrier or the like including a spool, said spool comprising a plurality of plate elements fixed in side by side face abutting relation, one portion of said plate elements intermediate others thereof having its outer peripheral surface recessed relative that of other plate elements by which it is bounded to define therewith a narrow track the base of which is provided by the outer periphery of said portion of said plate elements, said one portion of said plate elements being apertured to form therein a generally rectangular opening to provide a pocket in said spool which is laterally expanded by apertures in said bounding plate elements, one end of a cable having means providing an enlargement thereof anchored in said pocket, a restricted passage defined in said one portion of said plate elements, said passage being open at one end thereof to said pocket and having the other end thereof opening from said base of said track, the direction of said passage being laterally of and substantially at a right angle to a line radial to said spool, said passage providing a path through which said cable extends from said pocket, the configuration of said outer perpheral surface of said one portion of said plate elements, to one side of the opening of said restricted passage from said base, being formed in an essentially spiral arc, facilitating a natural, smooth wrap of said cable about said base and a smooth extension thereof from said spool.

2. Apparatus including a clutch for use in connecting a drive shaft to a device mounted thereon for rotation relative thereto which is used to lift or maintain a load not in excess of a predetermined limit, for example a tire lift/carrier, comprising a clutch plate connected to the shaft for rotation therewith, a further plate mounted to and for rotation on said shaft in an immediately following relation to said clutch plate, said further plate having the shape of a cup comprising a base portion and generally perpendicular thereto a shallow wall portion, said clutch plate being nested in said cup and having springs engaged thereto in a generally circular arrangement thereof, a plurality of said springs each having a portion thereof projecting outwardly of the outer peripheral boundary of said clutch plate and formed on a uniform radius and to include a further projection centered between its ends which has the shape of a tit, said projecting portions being in a substantially co-planar relation, said shallow wall portion presenting to the interior of said cup at each of a number of locations which are circularly spaced a wall formation arranged to receive and lodge one of said tits, each said tit being normally lodged and laterally contained in one of said wall formations to provide a normally positive and secure drive of said further plate and the device to which it is connected, on rotation of said shaft, absent said device being subjected to a load in excess of said predetermined limit.

3. Apparatus as in claim 2 wherein said clutch plate includes a series of flats defined on its outer periphery each of which is laterally bounded by two slots directed inwardly of said clutch plate the radial innermost extremity of each of which is laterally expanded, each of said springs is bow shaped, bounds one of said flats intermediate its respective ends and has its respective extremities projected into the expanded portions of the two slots which laterally bound said one flat to engage therein to said clutch plate, thereby to preclude the circular displacement thereof with reference to said clutch plate.

4. Tire lift/carrier apparatus including a drive shaft, a clutch plate mounted on and connected for rotation with said shaft, a spool mounted in bearing relation to said shaft to accommodate relative rotation therebetween, said clutch plate being normally in driving relation to said spool through interposed means which mount to and about said shaft, said spool being formed to define therein a narrow track having a base which is recessed relative to portions of said spool which define the sides of said track and bound said base thereof, a cable one end portion of which is anchored to said spool to align it with said base of said track, said interposed means including a further plate mounted to and for rotation on said shaft in an immediately following relation to said clutch plate, said further plate having the shape of a cup comprising a base portion and generally perpendicular thereto a shallow wall portion, said clutch plate being nested in said cup and having springs engaged thereto in a generally circular arrangement thereof, a plurality of said springs each having a portion thereof projecting outwardly of the outer peripheral boundary of said clutch plate and formed on a uniform radius and to include a further projection centered between its ends which has the shape of a tit, said projecting portions being in a substantially co-planar relation, said shallow wall portion presenting to the interior of said cup at each of a number of locations which are circularly spaced a wall formation arranged to receive and lodge therein one of said tits, each said tit being normally lodged and laterally contained in one of said wall formations to provide a normally positive and secure drive of said further plate and, therethrough, the other of said interposed portions and said spool on rotation of said shaft, absent said spool being subjected to a load in excess of prescribed limit.

5. Apparatus as in claim 4 comprising a housing including parallel side plates between which said clutch plate, said interposed means and said spool and anchored cable are laterally contained and said shallow wall portion of said further plate embodies integral, external, radially projected, flange means which on rotation of said shaft bear on the most adjacent surface of one of said side plates to maintain a balanced drive of the following interposed means and said spool.

6. Apparatus as in claim 4 comprising a housing including parallel side plates between which said clutch plate, said interposed means and said spool and anchored cable are laterally contained, means defining a cable guide contained in said housing at a location immediately of the periphery of said spool, said cable guide being formed to include a passage for exit of said cable from said housing the entrance to which is in a direct alignment with said base of said track, said cable being threaded through said passage, which provides in bounding relation thereto a plastic bearing surface for said cable as it is wrapped on or unwrapped from said spool and provides a smooth and controlled alignment of said cable with said track in its exit from and the wrap thereof on the base of said track.

7. Apparatus as in claim 6 including a further cable guide releasably connected at one end thereof to said first mentioned cable guide and extending therefrom to position within the outer peripheral portion of said track and set in circularly bounding relation to an excess of 180 degrees of the base of said track and the cable which is wrapped thereon to encompass the major extend of said cable between the side portions of said track.

8. Apparatus as in claim 7 wherein said passage for exit of said cable from said housing is extended by a tubular member one portion of which is bent in a smoothly curving arc to place the following portion thereof so as to extend in a direction different than that of said preceding portion of said cable.

9. Apparatus as in claim 8 wherein said apparatus is installed in connection wth a vehicle, said housing is mounted in a substantially horizontal position, said tubular member initially extends from said housing in a substantially horizontal line and said bent portion thereafter smoothly directs said cable from said horizontal to depend vertically therefrom for the engagement thereof to a load to be carried thereby or otherwise applied thereto.

10. Apparatus as in claim 7 wherein said side plates are bridged by a wall structure which forms its outer periphery and said peripheral wall structure provides means in backing relation to a least a portion of said cable guide means to maintain its required position in reference to said cable within the limits of said housing.

11. Apparatus as in claim 7 including a spring biased cable follower at the outer periphery of said track the bias of which provides that a portion thereof bears on the outermost layer of said cable which is wrapped on said base at any given time and said follower is mounted in connection with means which together with both the aforementioned cable guides is positioned to provide an essentially 360° bearing surface for the cable which is wrapped on the spool as it exits from, returns to said housing.

12. Apparatus as in claim 11 including means in connection with said spool the outer peripheral surface of which includes a plurality of relatively spaced ratchet teeth, the last said means rotating with said spool in the wrapping and unwrapping of said cable, and means movable in correspondence with the movement of said follower to interengage with and prevent the rotation of said means including said ratchet teeth and said spool on a predetermined portion of cable being left on said base as the cable is unwrapped therefrom and extended form said housing.

13. Apparatus as in claim 10 wherein said passage for exit of said cable from said housing is extended by a tubular member one portion of which is bent in a smoothly curving arc to place the following portion thereof so as to have the cable therein extend in a generally horizontal direction and then further bent to place the cable therein in a vertical orientation as it passes therethrough.

14. Tire lift/carrier apparatus comprising a drive shaft, a housing supporting said drive shaft for rotation, a clutch plate within said housing and mounted on said drive shaft for rotation therewith, a set of annular sheet metal plates forming a spool mounted on said drive shaft for relative rotation within said housing and defining a narrow annular track, said clutch plate being normally in driving relation to said spool through interposed means surrounding said shaft, an elongated flexible cable having opposite end portions, means mounted on one end portion of said cable for supporting a tire, means connecting the opposite end portion of said cable to said spool, said annular track of said spool having a width slightly greater than the diameter of said cable to confine said cable for wrapping radially outwardly in a spiral overlapping manner within said track, said interposed means including a drive plate supported for rotation relative to said shaft and adjacent said clutch plate, said drive plate including circumferentially spaced projections disposed around said clutch plate, spring elements mounted on said clutch plate and having portions projecting outwardly into engagement with said projections on said drive plate, said spring elements being deformable inwardly by said projections in response to relative rotation between said clutch plate and said drive plate and providing for driving said drive plate by said clutch plate with a predetermined limiting torque, said interposed means further including an eccentric cam member rotatable with said drive plate, an annular drive gear mounted on said cam member and supported for orbital movement in response to rotation of said cam member, a ring gear surrounding said drive gear, and means for rigidly securing said ring gear to said spool to effect rotation of said spool in response to rotation of said shaft and said clutch plate through said interposed means.

15. Apparatus as defined in claim 14 and including compressible plate means surrounding said shaft and disposed for limiting axial movement within said housing of the components surrounding said shaft.

16. Apparatus as defined in claim 14 wherein said spring elements encompass substantially the outer periphery of said clutch plate.

17. Apparatus as defined in claim 14 wherein said clutch plate is substantially flat and has a plurality of periphery spaced openings, and said spring elements have hooked end portions disposed within said openings.

18. Apparatus as defined in claim 14 and including a cable guide member mounted on said housing and defining an exit for said cable from said housing, and said guide member comprises a body of molded plastics material.

19. Apparatus as defined in claim 14 and including a sheet metal generally C-shaped plate disposed within said housing and projecting into said track of said spool for confining said cable within said track.

20. Apparatus as defined in claim 14 wherein said ring gear has peripherally spaced stop surfaces, a spring biased stop pawl is supported by said housing for engaging said stop surfaces, and means for sensing said cable within said track and for pivoting said stop pawl to assure winding of said cable on said spool in only one direction.

21. Tire lift/carrier apparatus comprising a drive shaft, a housing supporting said drive shaft for rotation, a clutch plate within said housing and mounted on said drive shaft for rotation therewith, a set of annular sheet metal plates forming a spool mounted on said drive shaft for relative rotation within said housing and defining a narrow annular track, said clutch plate being normally in driving relation to said spool through interposed means surrounding said shaft, an elongated flexible cable having opposite end portions, means mounted on one end portion of said cable for supporting a tire, means connecting the opposite end portion of said cable to said spool, said annular track of said spool having a width slightly greater than the diameter of said cable to confine said cable for wrapping radially outwardly in a spiral overlapping manner within said track, said interposed means including a drive plate supported for rotation relative to said shaft and adjacent said clutch plate, said drive plate including circumferentially spaced projections disposed around said clutch plate, spring elements mounted on said clutch plate and having portions projecting outwardly into engagement with said projections on said drive plate, said spring elements being deformable inwardly by said projections in response to relative rotation between said clutch plate and said drive plate and providing for driving said drive plate by said clutch plate with a predetermined limiting torque, said interposed means further including an eccentric cam member rotatable with said drive plate, an annular drive gear mounted on said cam member, a plate connected to said housing and supporting said drive gear for orbital movement in response to rotation of said cam member, a ring gear surrounding said drive gear and having at least one tooth more than the number of teeth on said drive gear, and means for rigidly securing said ring gear to said spool to effect rotation of said spool in response to rotation of said shaft and said clutch plate through said interposed means.

* * * * *

UNITED STATES PATENT AND TRADEMARK OFFICE
CERTIFICATE OF CORRECTION

PATENT NO.   : 4,625,947
DATED        : December 2, 1986
INVENTOR(S)  : Stephen A. Denman and Garthwood R. Taylor It is certified that error appears in the above-identified patent and that said Letters Patent are hereby corrected as shown below:

In The Specification

Column 1, line 28, cancel "or" and insert --of--.

Column 9, line 47, cancel "ouer" and insert --outer--.

Column 10, line 61, cancel "96" and insert --97--.

Column 15, line 18, cancel "portion" and insert --position--.

Column 15, line 56, cancel "where" and insert --when--.

In The Claims

Column 19, lines 29 and 30, cancel "extend" and insert --extent--.

Column 19, line 39, cancel "wth" and insert --with--.

Column 20, line 6, cancel "10" and insert --7--.

Signed and Sealed this

Seventeenth Day of February, 1987

Attest:

DONALD J. QUIGG

*Attesting Officer*   *Commissioner of Patents and Trademarks*